(12) United States Patent
Kim et al.

(10) Patent No.: US 11,331,997 B1
(45) Date of Patent: May 17, 2022

(54) POWER TRANSMISSION APPARATUS FOR HYBRID ELECTRIC VEHICLE

(71) Applicants: Hyundai Motor Company, Seoul (KR); Kia Corporation, Seoul (KR)

(72) Inventors: Dongwoo Kim, Incheon (KR); Seong Wook Hwang, Gunpo-si (KR); Kijong Park, Hwaseong-si (KR); Chon Ok Kim, Yongin-si (KR); Jong Hyo Park, Ansan-si (KR); Juhyeon Park, Hwaseong-si (KR); Sangki Kwak, Hwaseong-si (KR); Seong Kyeong Cheon, Hwaseong-si (KR); Kwang Hyun Won, Bucheon-si (KR); Soonki Eo, Ansan-si (KR); Yong Sug Choi, Hwaseong-si (KR); Ilhan Yoo, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/374,687

(22) Filed: Jul. 13, 2021

(30) Foreign Application Priority Data

Dec. 16, 2020 (KR) .................. 10-2020-0176217

(51) Int. Cl.
| B60K 6/365 | (2007.10) |
| B60K 6/547 | (2007.10) |
| F16H 1/28 | (2006.01) |
| B60K 6/543 | (2007.10) |

(52) U.S. Cl.
CPC .............. *B60K 6/365* (2013.01); *B60K 6/543* (2013.01); *B60K 6/547* (2013.01); *F16H 1/2863* (2013.01); *F16H 2200/0056* (2013.01)

(58) Field of Classification Search
None
See application file for complete search history.

(56) References Cited

U.S. PATENT DOCUMENTS

| 9,764,630 B2 | 9/2017 | Kaltenbach et al. |
| 10,047,840 B2 * | 8/2018 | Gumpoldsberger .. F16H 37/046 |
| 2002/0088291 A1 * | 7/2002 | Bowen .................. B60W 20/40 903/917 |
| 2005/0139035 A1 * | 6/2005 | Lee ...................... B60W 10/113 74/661 |
| 2007/0180942 A1 * | 8/2007 | Antonov ................. F16H 3/006 74/340 |

FOREIGN PATENT DOCUMENTS

DE 102007042949 A1 4/2009

* cited by examiner

*Primary Examiner* — Colby M Hansen
(74) *Attorney, Agent, or Firm* — Morgan, Lewis & Bockius LLP

(57) ABSTRACT

A hybrid power transmission apparatus for a vehicle which changes and outputs torque of an engine and a first motor, includes an input shaft selectively input engine torque through an engine clutch, an output externally engages with a differential final reduction gear through an output gear to output shifted torque, a fixed shifting section including a plurality of external gear sets implementing an engine mode having multiple fixed shifting stages, and a mode shifting section including a planetary gear set having a first rotation element fixedly connected to the input shaft and a third rotation element that is externally gear-engaged with a first motor gear of the first motor via a first gear, and one external gear set configured for power connection between a second rotation element of the planetary gear set and the output shaft.

17 Claims, 11 Drawing Sheets

FIG. 2

| Mode | | Shift stage | EC | DC | | | | Operation element | |
|---|---|---|---|---|---|---|---|---|---|
| | | | | PDC | DC1 | DC2 | DC3 | ENG | M1 |
| ENG | | D1 | ● | ● | ● | | | ● | |
| | | D2 | ● | | | ● | | ● | |
| | | D3 | ● | | | | ● | ● | |
| HEV | Parallel | D1 | ● | ● | ● | | | ● | ● |
| | | D2 | ● | | ● | ● | | ● | ● |
| | | D3 | ● | | ● | | ● | ● | ● |
| | eCVT | – | ● | | ● | | | ● | ● |
| EV | | | – | ● | ● | | | | ● |
| Charging (Neutral) | | – | ● | ● | | | | ● | (●) |

(●) : Driven to generate power

POWER TRANSMISSION APPARATUS FOR HYBRID ELECTRIC VEHICLE

CROSS-REFERENCE TO RELATED APPLICATION

The present application claims priority to Korean Patent Application No. 10-2020-0176217 filed on Dec. 16, 2020, the entire contents of which is incorporated herein for all purposes by this reference.

BACKGROUND OF THE INVENTION

Field of the Invention

The present invention relates to a transmission for a hybrid vehicle. More particularly, the present invention relates to a power transmission apparatus for a hybrid vehicle that improves a sense of torque disconnection of an engine by configuring a planetary gear set on an input shaft to transmit rotational power of a motor to an output shaft.

Description of Related Art

In vehicles, environment-friendly technology is a key technology for the survival of the future automotive industry, and vehicle makers are focusing their efforts on developing environment-friendly vehicles to resolve environmental and fuel economy regulations.

As a part of this environment-friendly automobile technology, in recent years, it has led to the development of a new transmission that secures the convenience of operation of an automatic transmission while maintaining the fuel efficiency of the manual transmission.

In other words, the developments of SAT (Semi Automatic Transmission), similar to a manual transmission, for gear change without a clutch pedal, Automated Manual Transmission (AMT) that enables driver operation such as automatic transmission by automating clutch operation and gear change, and dual-clutch transmission (DCT), which transmits power by crossing the two clutches and improves a sense of shift disconnection are in progress.

Automatic manual transmission is a next-generation transmission that automatically controls the clutch and shift lever with a hydraulic pressure control apparatus based on manual transmission, has high fuel efficiency and low cost of manual transmission, and enables easy shifting operation of automatic transmission.

However, this automated manual transmission has a large drawback with a sense of torque disconnection when shifting, and to overcome this, a hybrid power transmission apparatus provided with a motor at the rear of the friction clutch while being based on the basic mechanism of automated manual transmission is being developed.

However, this hybrid power transmission apparatus of a vehicle also has a limitation in that a sense of torque disconnection occurs to some extent because the engine power must be cut off during shifting.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a hybrid power transmission apparatus of a vehicle having advantages of minimizing a sense of torque disconnection when shifting by configuring a planetary gear set that transmits the torque of a motor to an output shaft on an input shaft.

Various exemplary embodiments of the present invention is a hybrid power transmission apparatus of which the shifting-stage may be extended by applying a fixed shifting section that implements a multi-stage fixed shifting-stage with a plurality of external gear sets between the input shaft and the output shaft.

A hybrid power transmission apparatus according to an exemplary embodiment implements engine mode, parallel mode, electro continuously variable transmission (eCVT) mode, and electric vehicle (EV) mode through a mode shifting section including one planetary gear set and one external gear set between the input shaft and the output shaft.

Various exemplary embodiments of the present invention is to provide a hybrid power transmission apparatus for a vehicle that increases power delivery efficiency and reduces material cost by applying a dog clutch as an engagement element that selectively connects the output shaft and the driven gear of the external gear set.

A hybrid power transmission apparatus for a vehicle which changes and outputs torque of an engine and a first motor, the hybrid power transmission apparatus according to various exemplary embodiments of the present invention may include an input shaft disposed on the same axis as an engine output shaft to selectively input engine torque through an engine clutch, an output shaft that is disposed in parallel with the input shaft spaced from the output shaft, and is engaged with a differential final reduction gear through an output gear to output shifted torque, a fixed shifting section including a plurality of external gear sets for power connection between the input shaft and the output shaft at different gear ratios, and implementing an engine mode having multiple fixed shifting stages, and a mode shifting section including a planetary gear set having a first rotation element fixedly connected to the input shaft and a third rotation element that is externally gear-engaged with a first motor gear of the first motor via a first gear, and one external gear set configured for power connection between a second rotation element of the planetary gear set and the output shaft, and mode shifting section implementing parallel mode with the fixed shifting section, and independently implementing eCVT mode, EV mode, and charging mode.

The planetary gear set may further include a planetary gear engagement element that is provided between the second rotation element and the third rotation element to selectively engage the second rotation element to the third rotation element so that the entire planetary gear set rotates as one.

The planetary gear engagement element may be one of a tooth engagement type clutch or a synchronizer.

The planetary gear set may be a single pinion planetary gear set where the first rotation element is a sun gear, the second rotation element is a planet carrier, and the third rotation element is a ring gear.

The planetary gear set may be a single pinion planetary gear set where the first rotation element is a ring gear, the second rotation element is a planet carrier, and the third rotation element is a sun gear.

The one external gear set may include a first drive gear fixedly connected to the second rotation element, and a first driven gear rotatably mounted on the output shaft without rotational interference with the output shaft, gear-engaged to the first drive gear, and selectively connectable to the output shaft through a first engagement element, wherein the one external gear set implements a first forward speed gear ratio.

The first engagement element may be one of a tooth engagement type clutch or a synchronizer.

The hybrid power transmission apparatus may further include a second motor gear-engaged with a second gear fixedly mounted on the engine output shaft through a second motor gear fixedly connected to a rotor of the second motor.

The engine clutch may be one of a tooth engagement type clutch or a synchronizer.

The fixed shifting section may include a drive gear fixedly mounted on the input shaft, and a driven gear rotatably mounted on the output shaft without rotational interference with the output shaft, gear-engaged with the drive gear, and selectively connectable to the output shaft through an engagement element, wherein the fixed shifting section is the plurality of external gear sets implementing the different gear ratios.

The engagement element may be one of a tooth engagement type clutch or a synchronizer.

The plurality of external gear sets may include a second external gear set including a second drive gear, which is fixedly mounted on the input shaft, and a second driven gear gear-engaged with the second drive gear rotatably mounted on the output shaft without rotational interference with the output shaft and selectively connectable to the output shaft through a second engagement element, wherein the second external gear set implements the second forward speed gear ratio, and a third external gear set including a third drive gear fixedly mounted on the input shaft, and a third driven gear gear-engaged with the third drive gear, rotatably mounted on the output shaft without rotational interference with the output shaft and selectively connectable to the output shaft through a third engagement element, wherein the third external gear set implements the third forward speed gear ratio.

The plurality of external gear sets may include a fourth external gear set including a fourth drive gear fixedly mounted on the input shaft, and a fourth driven gear gear-engaged with the fourth drive gear, rotatably mounted on the output shaft without rotational interference with the output shaft, and selectively connectable to the output shaft through a fourth engagement element, and the fourth driven gear implementing the fourth forward speed gear ratio, and a fifth external gear set GS5 including a fifth drive gear fixedly mounted on the input shaft, and a fifth driven gear rotatably mounted on the output shaft without rotational interference with the output shaft and gear-engaged with the fifth drive gear, and selectively connectable to the output shaft through a fifth engagement element, wherein the fifth driven gear implements the fifth forward speed gear ratio.

The plurality of external gear sets may include a sixth external gear set including a sixth drive gear fixedly mounted on the input shaft and a sixth driven gear rotatably mounted on the output shaft without rotational interference with the output shaft, gear-engaged with the sixth drive gear and selectively connectable to the output shaft through a sixth engagement element, wherein the sixth external gear set implements the sixth forward speed gear ratio, and a seventh external gear set including a seventh drive gear fixedly mounted on the input shaft and a seventh driven gear rotatably mounted on the output shaft without rotational interference with the output shaft, gear-engaged with the seventh drive gear, and selectively connectable to the output shaft through a seventh engagement element, wherein the seventh driven gear implements the seventh forward speed gear ratio.

The second, third, fourth, fifth, sixth and seventh engagement element may be second, a third, fourth, fifth, sixth and seventh dog clutch.

The hybrid power transmission apparatus for a vehicle according to various exemplary embodiments of the present invention additionally configures a planetary gear set that transmits the torque of the first motor to the output shaft on the input shaft, and engages through the eCVT mode when changing engine mode. By synchronizing the rotation speed of the rotation element coupled with the dog clutch, which is an element, shifting is possible without cutting the power of the engine. Accordingly, it is possible to minimize a sense of torque disconnection during the shifting process in particularly engine mode.

In addition, a fixed shifting section that implements multiple fixed shifting stages with a plurality of external gear sets is provided between the input shaft and the output shaft, and the fixed shifting-stage may be extended by adding an external gear set to the fixed shifting section.

In addition, a mode shifting section including a planetary gear set and a first external gear set placed between the input shaft and the output shaft to provide various shifting modes may implement various shifting modes including engine mode, parallel mode, eCVT mode, EV mode, and charging mode along with a fixed shifting section.

In addition, by applying a dog clutch as an engagement element that selectively connects the output shaft and driven gears of all external gear sets, it can increase power delivery efficiency, reduce overall length, and reduce weight and material costs.

In addition, the effect obtained or predicted by an exemplary embodiment of the present invention will be disclosed directly or implicitly in the detailed description of an exemplary embodiment of the present invention. That is, various effects predicted according to various exemplary embodiments of the present invention will be disclosed within a detailed description to be described later.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of a hybrid power transmission apparatus for a vehicle according to the various exemplary embodiments of the present invention.

Figure 1:
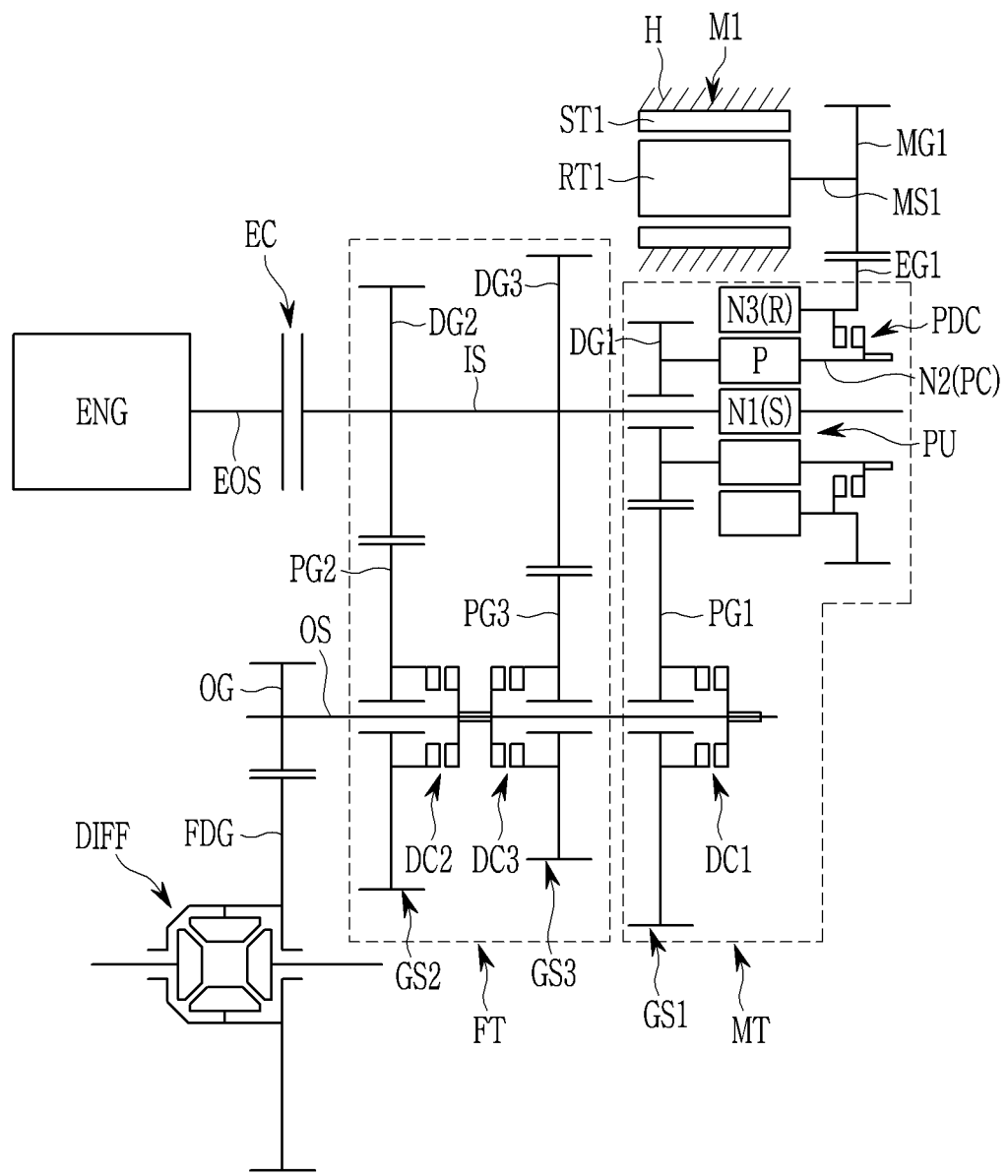
FIG. 1 is a schematic diagram of a power transmission apparatus configured for a hybrid vehicle according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, with reference to the accompanying drawing, of the present invention an exemplary embodiment of the present invention will be described in detail so that a person of an ordinary skill in the technical field to which various exemplary embodiments of the present invention belongs may be easily implemented. However, the present invention may be implemented in various different forms and is not limited to the exemplary embodiment described herein.

The drawings and description are to be regarded as illustrative in nature and not restrictive, and the same or similar constituent elements are described by applying the same reference numeral throughout the specification.

In the following description, dividing names of components into first, second, and the like is to divide the names because the names of the components are the same as each other, and an order thereof is not particularly limited.

FIG. 1 is a schematic diagram of a power transmission apparatus for a hybrid vehicle according to various exemplary embodiments of the present invention.

Referring to FIG. 1, a transmission according to the various exemplary embodiments of the present invention shifts and outputs torque of an engine ENG and a first motor M1 as power sources and includes an input shaft IS, an output shaft OS, a mode shifting section MT, and a fixed shifting section FT.

For engine ENG, which is the power source, a known internal combustion engine such as a gasoline engine or a diesel engine that uses fossil fuel may be used.

The first motor M1 may perform the motor and generator functions as known, and includes a first stator ST1 fixed to a transmission housing H and a first rotor RT1 supported to rotate in the radial direction of the first stator ST1.

The torque of engine ENG and first motor M1 is shifted to engine mode, parallel mode, eCVT mode, EV mode by the mode shifting section MT and the fixed shifting section FT configured between the input shaft IS and the output shaft OS and the torque is transmitted to a differential DIFF through an output gear OG on the OS.

The input shaft IS to which the torque of the engine ENG is transmitted is disposed on the same axis as the engine output shaft EOS, and the output shaft OS is disposed in parallel with the input shaft IS.

An engine clutch EC is provided between the input shaft IS and the engine output shaft EOS, and the input shaft IS and the engine output shaft EOS are selectively connectable through the engine clutch EC, so that the torque of the engine ENG is selectively transmitted to the input shaft IS.

Here, the engine clutch EC may be a multi-plate hydraulic pressure friction device operated by hydraulic pressure supplied from a hydraulic pressure control apparatus, and a wet multi-plate hydraulic pressure friction coupling unit is mainly used. Also, the engine clutch EC may be a coupling unit that may be operated according to the electrical signal supplied from the electronic control apparatus, such as a dog clutch, an electronic clutch, and a magnetic powder clutch.

The output gear OG is fixedly connected to one side of the output shaft OS, the output gear OG is externally geared with a final reduction gear FDG of the differential DIFF, and the torque is shifted and transmitted through the mode shifting section MT and the fixed shifting section FT to the differential DIFF.

The mode shifting section MT includes a planetary gear set PU disposed on the input shaft IS, and a first external gear set GS1 disposed between the planetary gear set PU and the output shaft OS.

The planetary gear set PU is a single pinion planetary gear set and includes a sun gear S, which is a first rotation element N1, a planet carrier PC, which is a second rotation element N2 that supports a plurality of pinion gear P to rotate and revolve and externally gear-engaged with the sun gear S, and a ring gear R, which is a third rotation element N3, which is engaged internally with the plurality of pinion gear P and is power connected to the sun gear S.

In the planetary gear set PU, the sun gear S as the first rotation element N1 is fixedly connected to the input shaft IS, and torque is input from the input shaft IS, and the ring gear R as the third rotation element N3 is externally geared with a first motor gear MG1 fixed to a first motor shaft MS1 of the first motor M1 through a first external gear EG1.

A planetary gear dog clutch PDC is provided between the planet carrier PC (the second rotation element N2) and the ring gear R (the third rotation element N3). The dog clutch PDC may selectively combine the planet carrier PC and the ring gear R so that the entire planetary gear set PU rotates as one.

The first external gear set GS1 transmits torque between the planet carrier PC, which is the second rotation element N2 of the planetary gear set PU, and the output shaft OS.

The first external gear set GS1 includes a first drive gear DG1 fixedly connected to the planet carrier PC, which is the second rotation element N2 of the planetary gear set PU, and a first driven gear PG1 which is disposed on the output shaft OS without rotational interference and is externally gear-engaged with the first drive gear DG1, and the first external gear set GS1 implements the first forward speed gear ratio.

The first driven gear PG1 is selectively connectable to the output shaft OS via a first dog clutch DC1, which is a first engagement element.

This mode shifting section MT implements a shifting mode of a parallel mode, an eCVT mode, and an EV mode along with the fixed shifting section FT.

The fixed shifting section FT includes second and third external gear sets GS2 and GS3 that are power connected to the input shaft IS and the output shaft OS with different gear ratios, and implements fixed shifting-stage of the second forward speed and the third forward speed.

The second external gear set GS2 includes a second drive gear DG2, which is fixedly mounted on the input shaft IS, and a second driven gear PG2 externally gear-engaged with the second drive gear DG2 disposed on the output shaft OS without rotational interference, and second external gear set GS2 implements the second forward speed gear ratio.

Here, the second driven gear PG2 is selectively connectable to the output shaft OS through a second dog clutch DC2, which is a second engagement element.

The third external gear set GS3 includes a third drive gear DG3 fixedly mounted on the input shaft IS, and a third driven gear PG3 externally gear-engaged with the third drive gear DG3 disposed on the output shaft OS without rotational interference, and the third external gear set GS3 implements the third forward speed gear ratio.

Here, the third driven gear PG3 is selectively connectable to the output shaft OS through a third dog clutch DC3, which is a third engagement element.

In the various exemplary embodiments of the present invention, the gear ratio for each drive gear and driven gear forming the first, second, third external gear set GS1, GS2, and GS3 may be set according to the design condition of the transmission required.

In addition, in the various exemplary embodiments of the present invention, power delivery efficiency is increased by applying a dog clutch that powers connects all engagement elements except engine clutch EC by teeth-engaged with, and reduces the overall length of transmission compared to synchronizer or friction clutch. However, it is not limited thereto, a tooth-engaged type clutch or a synchronizer that can minimize friction drag loss may be applied.

In addition, since the first, second, and third dog clutches DC1, DC2, and DC3 are known configurations, detailed description is omitted, and a separate actuator is provided as in the known, and the actuator is controlled by the transmission control unit while shifting.

FIG. 2 is an operation chart of a hybrid power transmission apparatus for a vehicle according to the various exemplary embodiments of the present invention in FIG. 1.

The hybrid power transmission apparatus for a vehicle according to the various exemplary embodiments of the present invention can implement an engine mode and a parallel mode with three fixed shifting stages, an eCVT mode, an EV mode, and a charging mode. This shifting process is as follows.

[Engine Mode the First Forward Speed](Parallel Mode the First Forward Speed)

Referring to FIG. 2, in the first forward speed D1 of the engine ENG mode, the engine clutch EC, the planetary gear dog clutch PDC, and the first dog clutch DC1 are operated while the engine ENG is driven.

Accordingly, the engine output shaft EOS and the input shaft IS are connected to, the planetary gear set PU rotates as one, and the first driven gear PG1 is connected to the output shaft OS.

Accordingly, the torque of the engine ENG is transmitted to the differential DIFF through the engine output shaft EOS, the input shaft IS, the planetary gear set PU, the first external gear set GS1, the, the output shaft OS, and the output gear OG, and thus the first forward speed D1 is implemented.

And in the first forward speed D1 of the engine ENG mode, the case of driving by the torque of the engine ENG is described. At this time, when the first motor M1 is driven, the torque of the first motor M1 is transmitted to the ring gear R of the planetary gear set PU. As it is input, it is combined with the torque of the engine ENG that is input to the sun gear S. In addition, the combined torque is transmitted to the output shaft OS through the first external gear set GS1, facilitating torque assist to be implemented in parallel mode the first forward speed D1.

[Engine Mode the Second Forward Speed] (Parallel Mode the Second Forward Speed)

Referring to FIG. 2, in the second forward speed D2 of the engine ENG mode, the engine clutch EC and the second dog clutch DC2 are operated while the engine ENG is driven.

Accordingly, the engine output shaft EOS and the input shaft IS are connected to, and the second driven gear PG2 is connected to the output shaft OS.

Accordingly, the torque of the engine ENG is transmitted to the differential DIFF through the engine output shaft EOS, the input shaft IS, the planetary gear set PU, the first external gear set GS1, the, the output shaft OS, and the output gear OG, and thus the second forward speed D2 is implemented.

And in the second forward speed D2 of the engine ENG mode, the case of driving by the torque of the engine ENG is described. At this time, when the first dog clutch DC1 is operated and the first motor M1 is driven, the torque of the first motor M1 is transmitted to the ring gear R of the planetary gear set PU. As it is input, it is combined with the torque of the engine ENG that is input to the sun gear S. In addition, the combined torque is transmitted to the output shaft OS through the first external gear set GS1, facilitating torque assist to be implemented in parallel mode the second forward speed D2.

[Engine Mode the Third Forward Speed] (Parallel Mode the Third Forward Speed)

Referring to FIG. 2, in the third forward speed D3 of the engine ENG mode, the engine clutch EC and the third dog clutch DC3 are operated while the engine ENG is driven.

Accordingly, the engine output shaft EOS and the input shaft IS are connected to, and the third driven gear PG3 is connected to the output shaft OS.

Accordingly, the torque of the engine ENG is transmitted to the differential DIFF through the engine output shaft EOS, the input shaft IS, the planetary gear set PU, the first external gear set GS1, the, the output shaft OS, and the output gear OG, and thus the third forward speed D3 is implemented.

And in the third forward speed D3 of engine ENG mode, the case of driving by the torque of the engine ENG is described. At this time, when the first dog clutch DC1 is operated and the first motor M1 is driven, the torque of the first motor M1 is transmitted to the ring gear R of the planetary gear set PU. As it is input, it is combined with the torque of the engine ENG that is input to the sun gear S. In addition, the combined torque is transmitted to the output shaft OS through the first external gear set GS1, facilitating torque assist to be implemented in parallel mode the third forward speed D3.

The hybrid power transmission apparatus of a vehicle according to various exemplary embodiments of the present invention uses a dog clutch as the first, second, and third engagement elements, so when the torque of engine ENG is not blocked, the torque applied to the dog clutch must be set to "0" to allow the dog clutch to be engaged and released. In addition, the dog clutch may be combined only when the rotation speed of the output shaft OS and driven gear PG1, PG2, and PG3 are synchronized.

In this way, the torque of the first motor M1 is used in eCVT mode to remove the torque applied to the dog clutch or to synchronize the rotation speed of the output shaft OS and driven gear PG1, PG2, and PG3.

FIG. 3, FIG. 4, FIG. 5, FIG. 6, and FIG. 7 is a power flowchart for explaining step-by-step a shifting process of a hybrid power transmission apparatus configured for a vehicle according to the various exemplary embodiments of the present invention in FIG. 1.

Hereinafter, a shifting process from the second forward speed D2 to the third forward speed D3 in engine ENG mode will be described using this principle.

Figure 3:
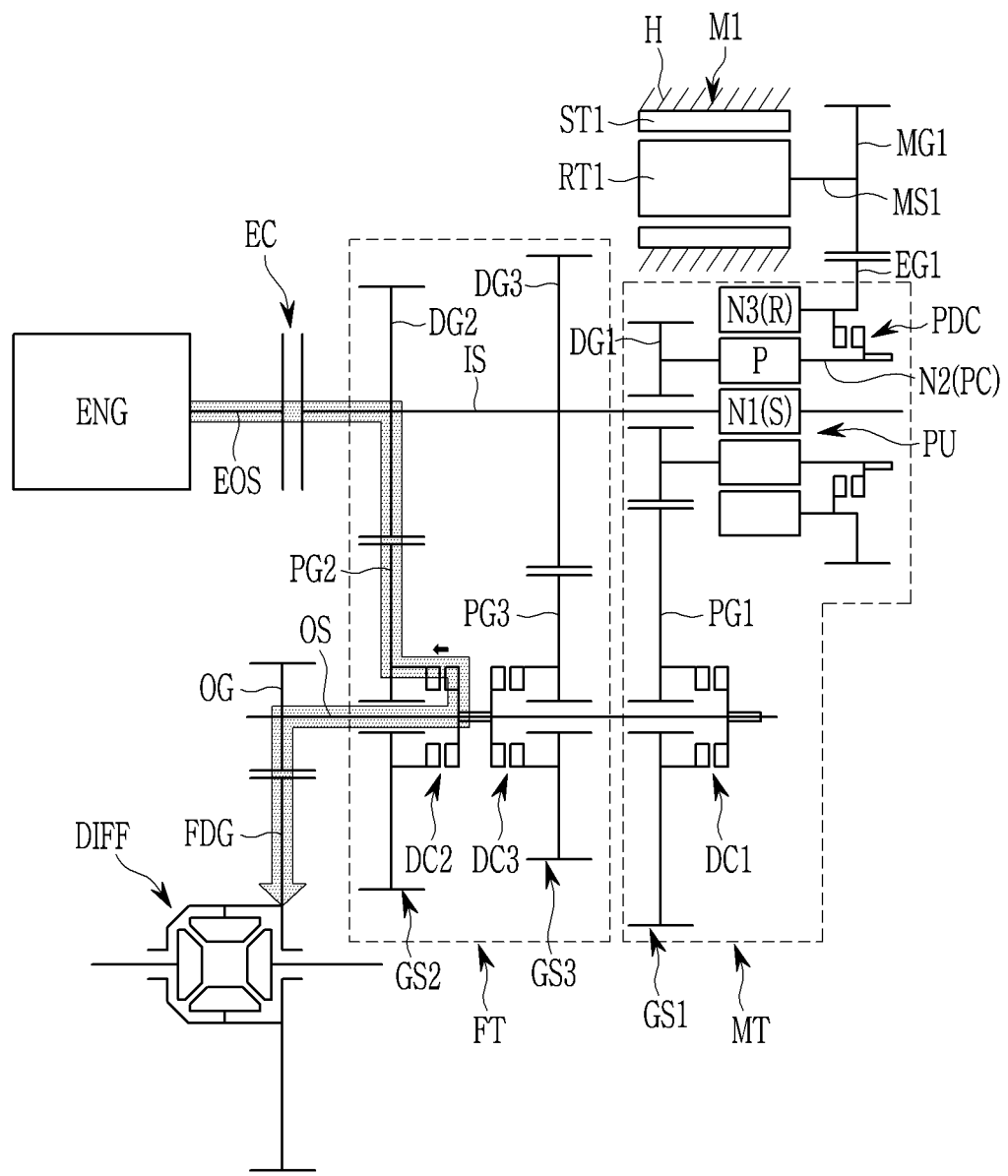
FIG. 3, FIG. 4, FIG. 5, FIG. 6, and FIG. 7 is a power flowchart for explaining step-by-step a shifting process of a hybrid power transmission apparatus for a vehicle according to the various exemplary embodiments of the present invention.

Referring to FIG. 3, with the engine ENG running, the engine clutch EC and the second dog clutch DC2 are operated to implement the second forward speed D2 in the engine ENG mode.

Figure 4:
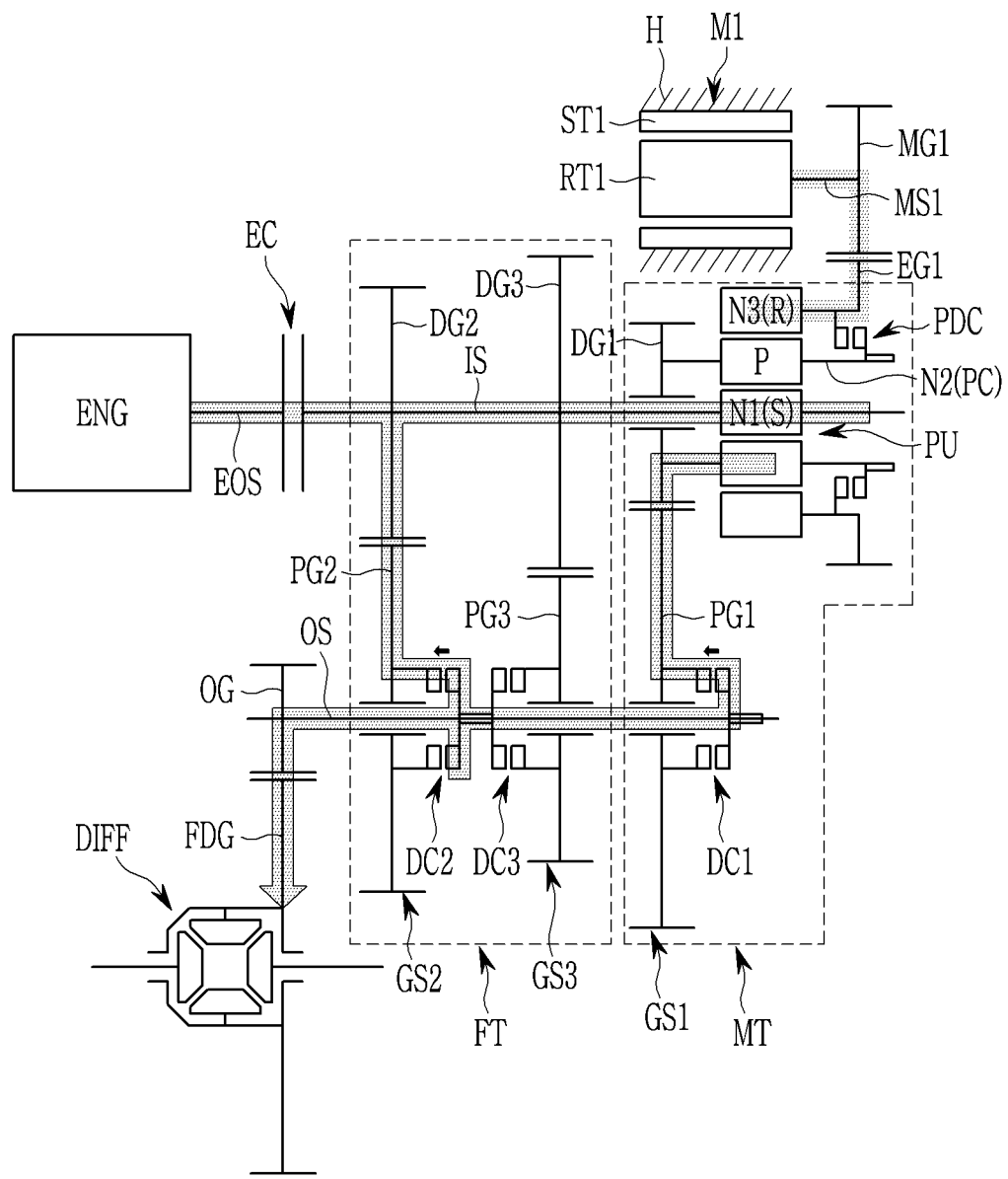

Referring to FIG. 4, during the second forward speed D2 in the engine ENG mode, the first dog clutch DC1 is operated and the first motor M1 is driven to implement the second forward speed D2 in the parallel mode. In this state, the rotation speed of the first motor M1 is controlled to eliminate the torque applied to the second dog clutch DC2.

Figure 5:
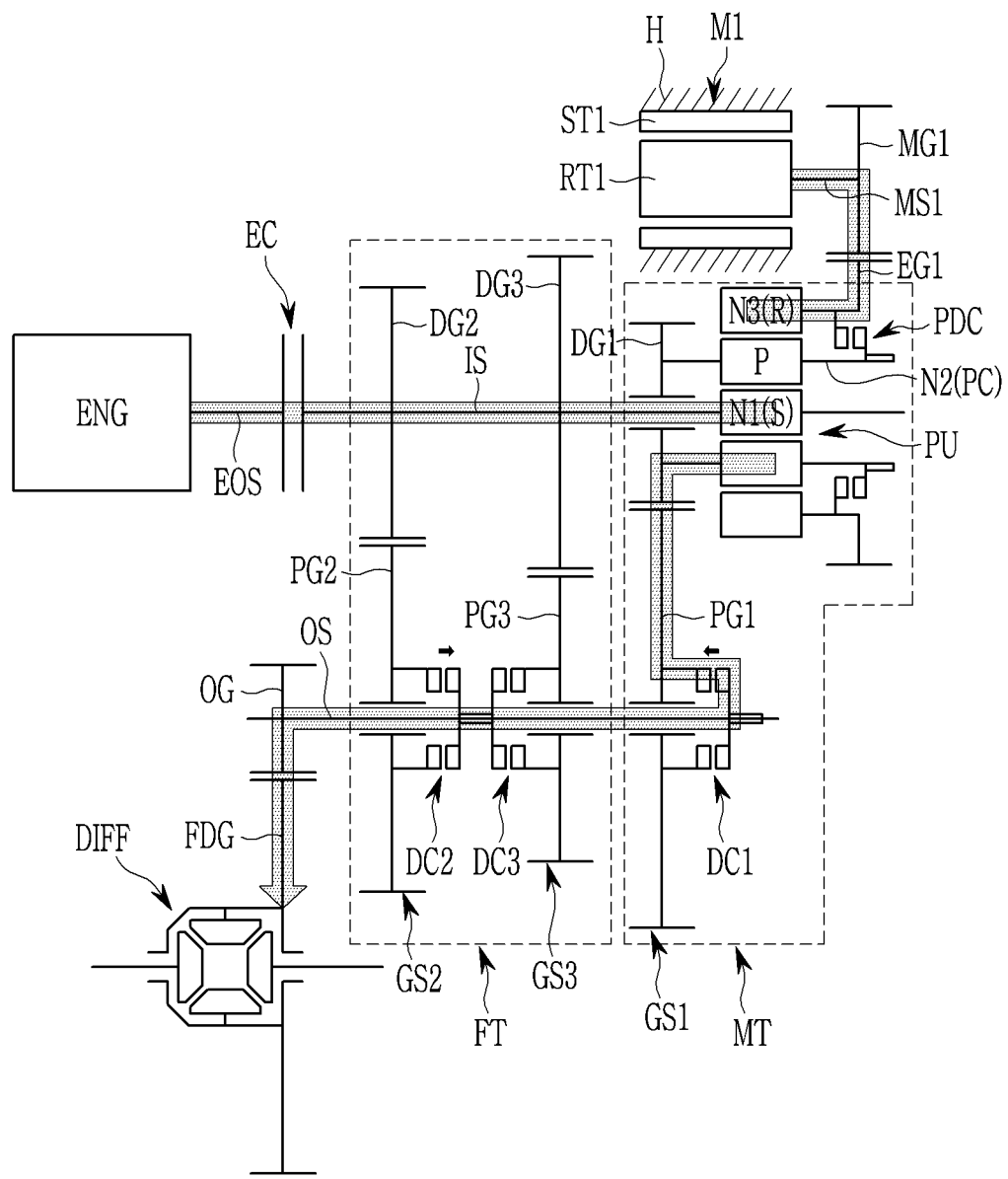

Referring to FIG. 5, during the second forward speed D2 in the parallel mode, when the torque applied to the second dog clutch DC2 becomes '0', the eCVT mode is implemented by releasing the operation of the second dog clutch DC2, and in that state, the rotation speed of the first motor M1 is controlled to synchronize the rotation speed of the output shaft OS and the third driven gear PG3.

Figure 6:
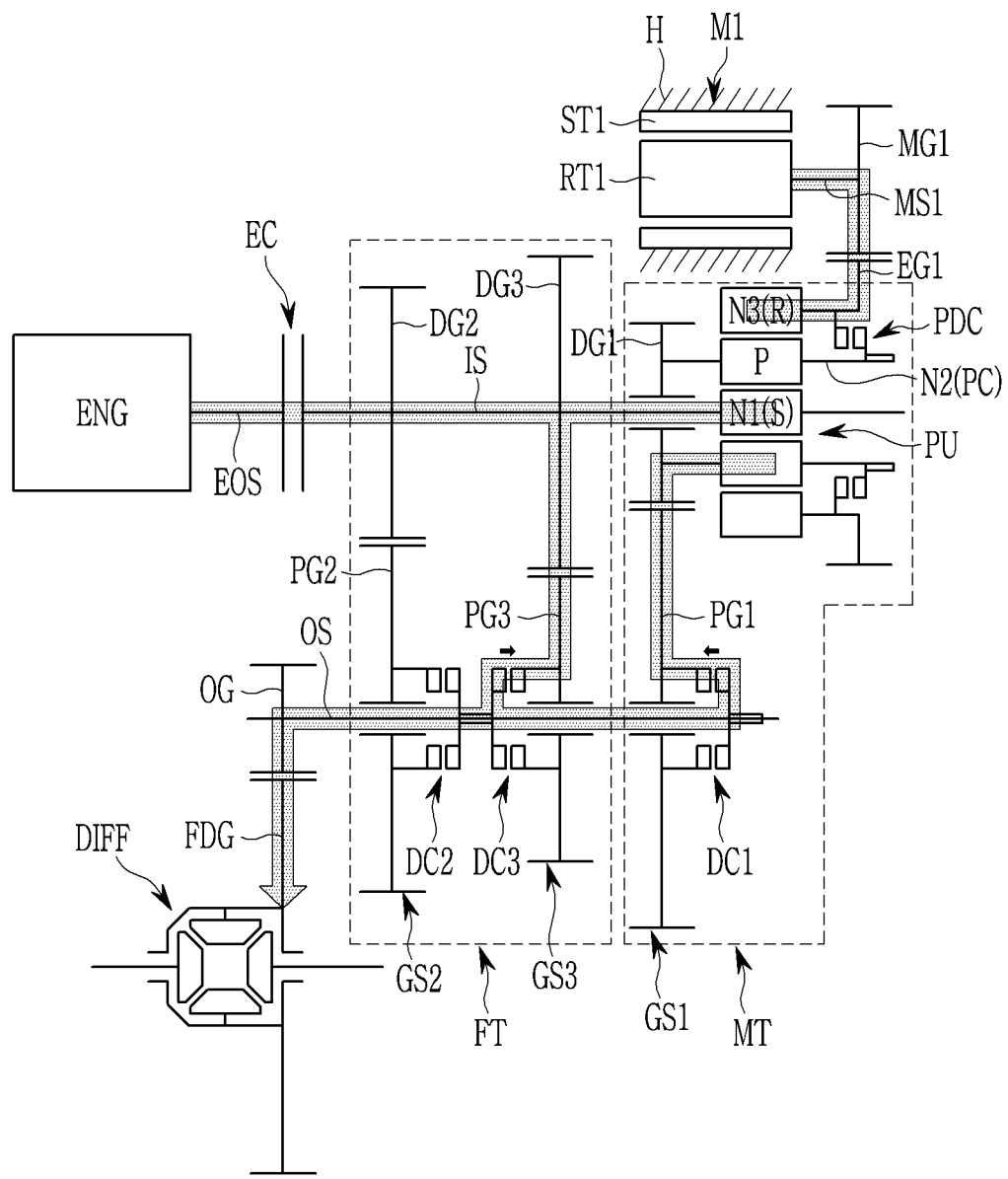

Referring to FIG. 6, when the rotation speed of the output shaft OS and the third driven gear PG3 are synchronized in the eCVT mode, the third dog clutch DC3 is operated to connect the output shaft OS and the third driven gear PG3 to implement the third forward speed D3 in the parallel mode.

Figure 7:
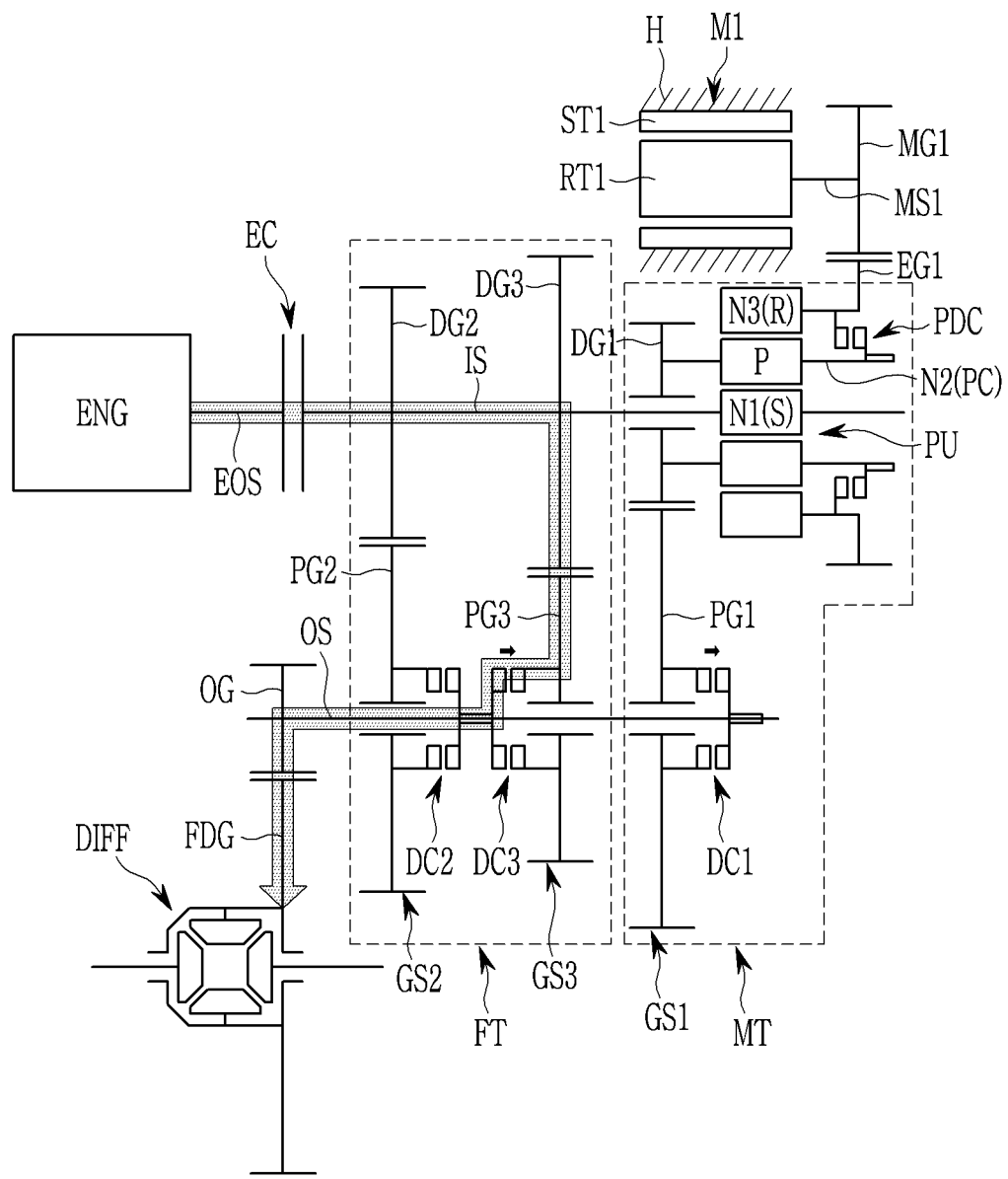

Referring to FIG. 7, during the third forward speed D3 in the parallel mode, when the first motor M1 is stopped and the first dog clutch DC1 is released, the torque of the engine ENG is transmitted to the differential DIFF through the engine output shaft EOS, the input shaft IS, the third external gear set GS3, the output shaft OS, and the output gear OG so that the third forward speed D3 in the engine ENG mode is implemented.

In a process of shifting from the second forward speed D2 to the third forward speed D3 of this engine ENG mode, the shifting process of the second forward speed D2 of the parallel mode, the eCVT mode, and the third forward speed D3 of the parallel mode may be performed for a short time period that the driver cannot recognize, and a sense of torque disconnection may be minimized because the torque of the engine ENG is not blocked.

In addition, in the second forward speed D2 and the third forward speed D3 of the engine ENG mode, the first dog clutch DC1 may be operated at all times while the first motor M1 is stopped to prepare for shifting to another shift-stage.

[eCVT Mode]

Referring to FIG. 5, in eCVT mode, the engine ENG and the first motor M1 are driven, and the engine clutch EC and the first dog clutch DC1 are operated.

Accordingly, the engine output shaft EOS and the input shaft IS are connected to, and the first driven gear PG1 is connected to the output shaft OS.

Accordingly, the torque of the engine ENG is input to the engine output shaft EOS, the input shaft IS, and the sun gear S of the planetary gear set PU, and the torque of the first motor M1 is input to the ring gear R of the planetary gear set PU and combined to output through the planet carrier PC.

Accordingly, the torque output through the planet carrier PC is transmitted to the differential DIFF through the first external gear set GS1, the output shaft OS, and the output gear OG, the eCVT mode is implemented.

On the other hand, in the eCVT mode, the torque of the engine ENG and the torque of the first motor M1 become wheel torque, so starting performance may be secured with a relatively small gear ratio, while charging the battery even in the low state of charge (SOC) value of the battery.

In addition, in the eCVT mode, the engine clutch EC, which is a friction clutch, can start in an always-coupled state without friction, reducing the capacity of the friction clutch.

[EV Mode]

In EV mode, the engine clutch EC is deactivated and the engine ENG is stopped, the first motor M1 is driven, and the planetary gear dog clutch PDC and the first dog clutch DC1 are operated.

Accordingly, the whole planetary gear set PU rotates as one, and the first driven gear PG1 is connected to the output shaft OS.

Accordingly, the torque of the first motor M1 is transmitted to the differential DIFF through the planetary gear set PU, the first external gear set GS1, the output shaft OS, and the output gear OG, the EV mode is implemented.

In the instant case, if the first motor M1 is driven by reverse rotation, reverse speed shift in the EV mode is implemented.

[Charging Mode]

In charging mode, the engine clutch EC is operated, and the planetary gear dog clutch PDC is operated while the engine ENG is driven.

Accordingly, the engine output shaft EOS and the input shaft IS are connected to, and the planetary gear set PU rotates as one.

Accordingly, the torque of the engine ENG is transmitted to the first motor M1 through the planetary gear set PU, the first external gear EG1, and the first motor gear MG1, and the first motor M1 is driven to generate power, implementing the charging mode.

Figure 8:
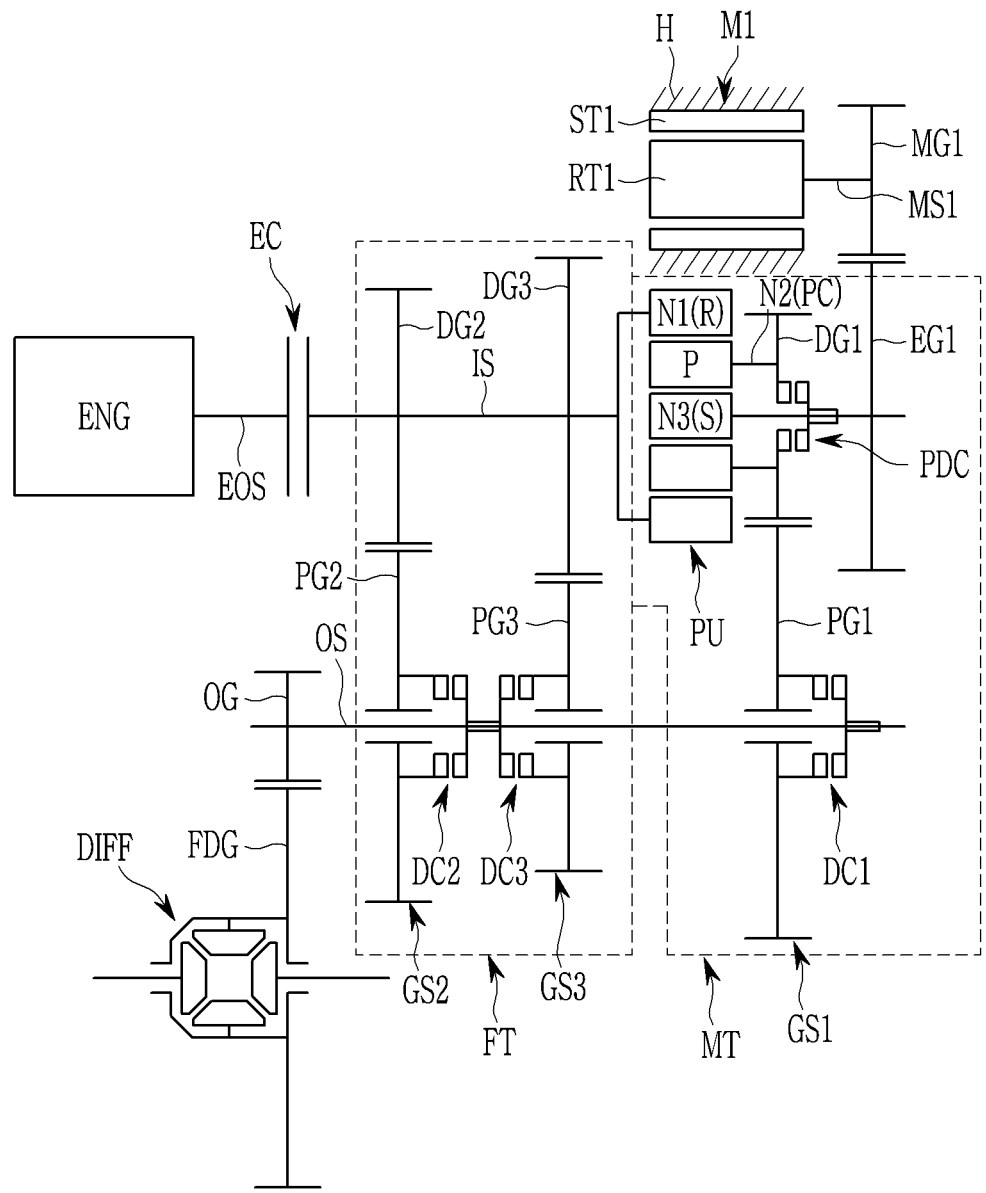
FIG. 8 is a schematic view of a hybrid power transmission apparatus for a vehicle according to various exemplary embodiments of the present invention.

FIG. 8 is a schematic view of a hybrid power transmission apparatus of a vehicle according to various exemplary embodiments of the present invention.

Referring to FIG. 8, the hybrid power transmission apparatus of a vehicle according to the various exemplary embodiments of the present invention has a difference in the connection configuration of the planetary gear set PU of the mode shifting section MT compared to the configuration of the various exemplary embodiments in FIG. 1.

The planetary gear set PU may include a ring gear R that is a first rotation element N1, a planet carrier PC that is a second rotation element N2, and a sun gear S that is a third rotation element N3.

The ring gear R as the first rotation element N1 is fixedly connected to an input shaft IS to receive torque from the input shaft IS. and the sun gear S as the third rotation element N3 is externally geared with a first motor gear MG1 fixed to a first motor shaft MS1 of a first motor M1 via a first external gear EG1.

A planetary gear dog clutch PDC as a planetary gear engagement element is provided between the planet carrier PC (second rotation element N2) and the sun gear S (third rotation element N3). The dog clutch PDC selectively combines the planet carrier PC and the sun gear S so that the entire planetary gear set PU rotates as one.

Accordingly, the various exemplary embodiments of the present invention in FIG. 8 has a difference in the connection configuration of the planetary gear set PU compared to the various exemplary embodiments of the present invention in FIG. 1, and the connection relationship of other constituent elements is the same as that of the various exemplary embodiments of the present invention in FIG. 1, so a detailed description of the configuration is omitted.

In addition, the shifting device of the hybrid vehicle according to the various exemplary embodiments of the present invention in FIG. 8 includes an engine mode and parallel mode with three fixed shifting stages, and a shifting mode including eCVT mode, EV mode, and charging mode is the same as that of the various exemplary embodiments of the present invention in FIG. 1, and thus detailed operation descriptions are omitted.

Figure 9:
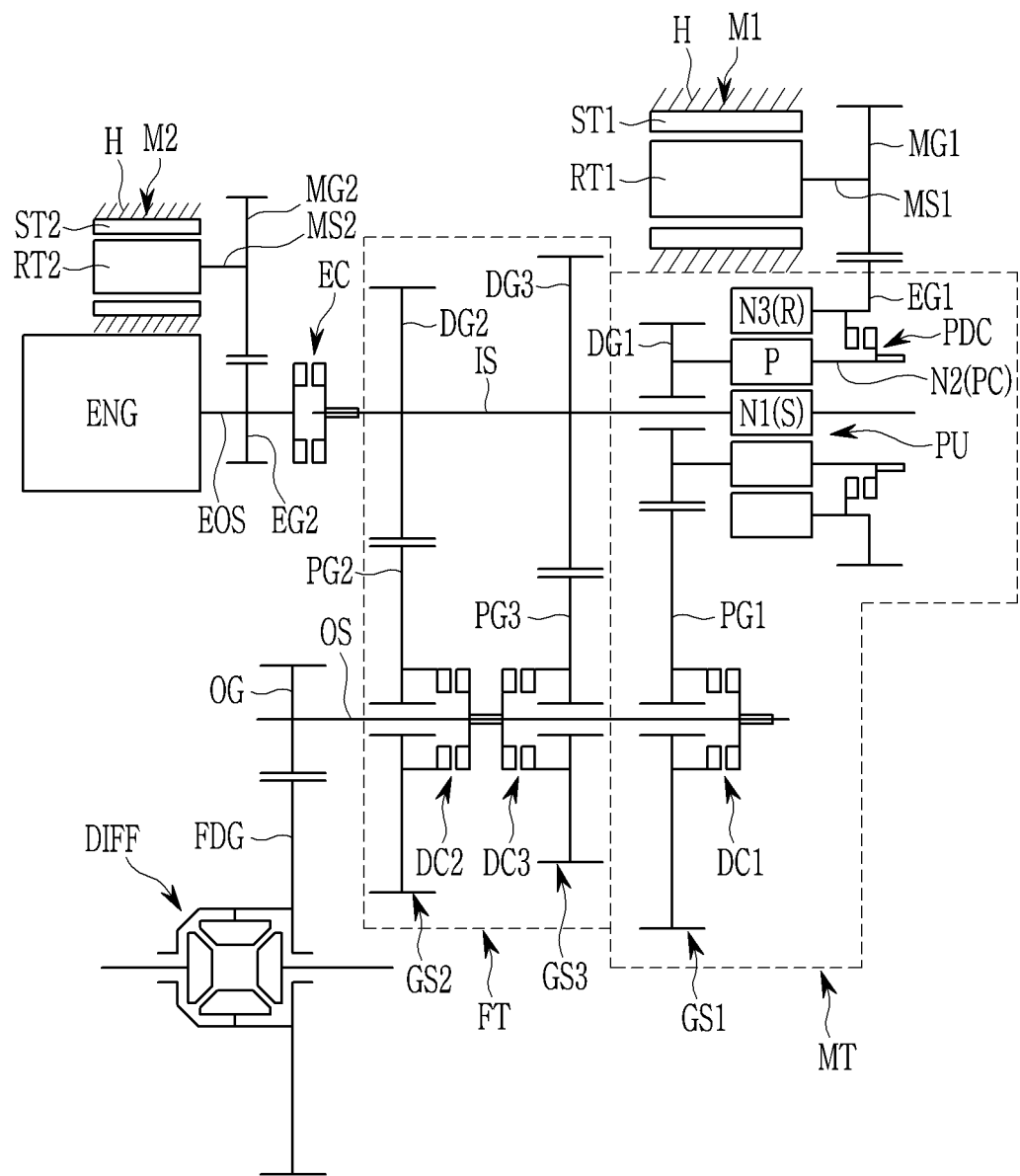
FIG. 9 is a schematic view of a hybrid power transmission apparatus for a vehicle according to various exemplary embodiments of the present invention.

FIG. 9 is a schematic view of a hybrid power transmission apparatus for a vehicle according to various exemplary embodiments of the present invention.

Referring to FIG. 9, the hybrid power transmission apparatus for a vehicle according to the various exemplary embodiments of the present invention further includes a second motor M2 disposed on the line of the engine output shaft EOS, compared with the configuration of the various exemplary embodiments in FIG. 1. A second motor gear MG2 fixedly connected to a second motor shaft MS2 of the second motor M2 is external gear connected to a second external gear EG2 fixedly connected to the engine output shaft EOS, and a dog clutch of the tooth coupling type may be applied to the engine clutch EC.

That is, the second motor M2 applied to the various exemplary embodiments in FIG. 9 is applied as a synchronization means to synchronize the rotation speed of the engine output shaft EOS and the input shaft IS to teeth-engaged the engine clutch EC applied as a dog clutch.

As described above, in the various exemplary embodiments of the present invention in FIG. 9, the second motor M2 is additionally applied compared to the various exemplary embodiments of the present invention in FIG. 1, and there is a difference in that the dog clutch of the engine clutch EC is teeth-engaged type and the connection relationship between other constituent elements is the same as in the various exemplary embodiments of the present invention in FIG. 1, and thus detailed descriptions of the configuration are omitted.

In addition, the shifting device of the hybrid vehicle according to the various exemplary embodiments of the present invention in FIG. 9 includes an engine mode and parallel mode with three fixed shifting stages, and a shifting mode including eCVT mode, EV mode, and charging mode is the same as that of the various exemplary embodiments of the present invention in FIG. 1, and thus detailed operation descriptions are omitted.

Figure 10:
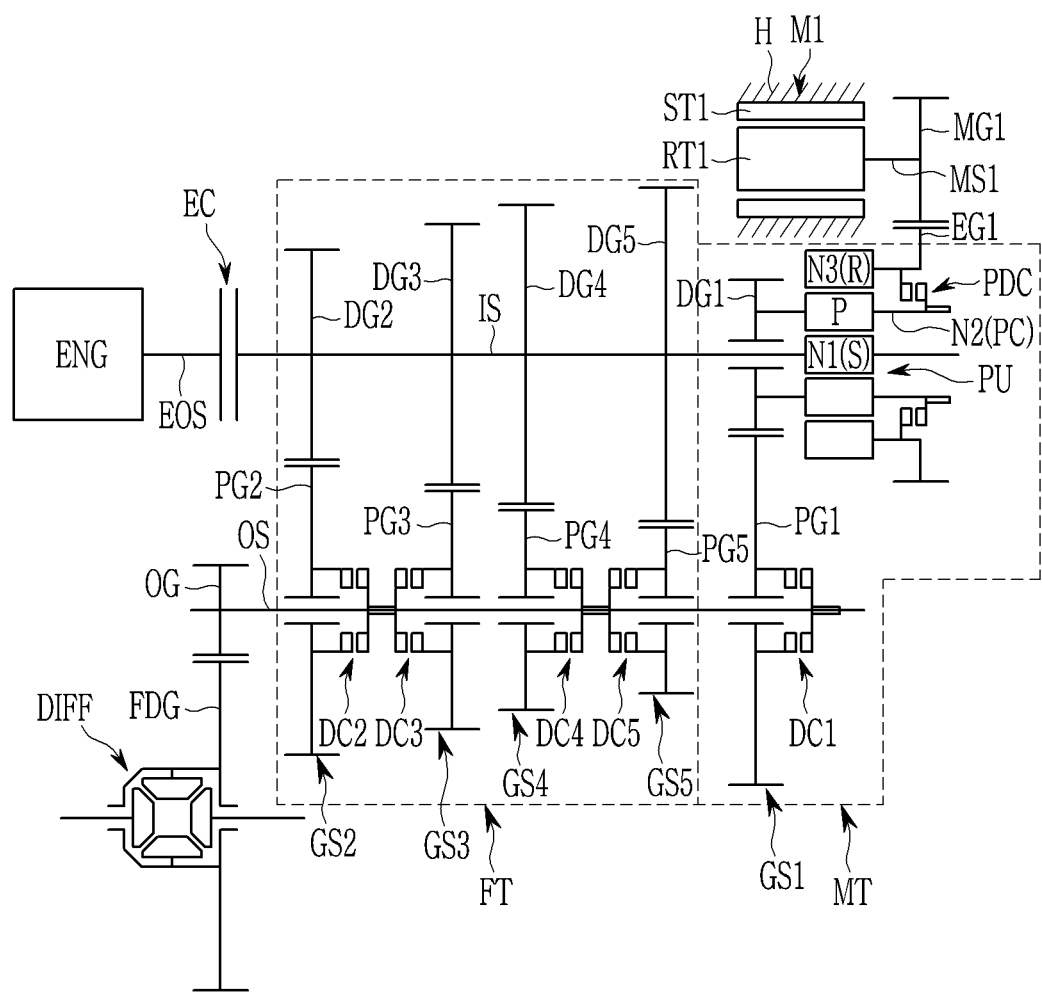
FIG. 10 is a schematic view of a hybrid power transmission apparatus for a vehicle according to various exemplary embodiments of the present invention.

FIG. 10 is a schematic view of a hybrid power transmission apparatus for a vehicle according to various exemplary embodiments of the present invention.

Referring to FIG. 10, the hybrid power transmission apparatus for a vehicle according to the various exemplary embodiments of the present invention has a difference in the number of external gear sets applied to the fixed shifting section FT compared to the configuration of the various exemplary embodiments in FIG. 1.

That is, compared with the various exemplary embodiments of the present invention in FIG. 1, the fixed shifting section FT according to the various exemplary embodiments further in FIG. 10 include fourth and fifth external gear sets GS4, and GS5 configured between the input shaft IS and the output shaft OS, for implementing the fixed shifting-stage of the fourth forward speed and the fifth forward speed.

The fourth external gear set GS4 includes a fourth drive gear DG4 fixedly mounted on the input shaft IS, and a fourth driven gear PG4 externally gear-engaged with the fourth drive gear DG4 disposed without rotational interference on the output shaft OS, and implements the fourth forward speed gear ratio.

Here, the fourth driven gear PG4 is selectively connectable to the output shaft OS through the fourth dog clutch DC4 which is the fourth engagement element.

The fifth external gear set GS5 includes a fifth drive gear DG5 fixedly mounted on the input shaft IS, and a fifth driven gear PG5 externally gear-engaged with the fifth drive gear DG5 disposed on the output shaft OS without rotational interference, and Implements the fifth forward speed gear ratio.

Here, the fifth driven gear PG5 is selectively connectable to the output shaft OS through the fifth engagement element, the fifth dog clutch DC5.

In the various exemplary embodiments of the present invention, the gear ratio for each drive gear and driven gear forming the first, second, third, fourth, and fifth external gear sets GS1, GS2, GS3, GS4, and GS5 may be set according to the design condition of the transmission required.

In addition, in the various exemplary embodiments of the present invention, a dog clutch that powers connects all engagement elements except the engine clutch EC by teeth-engaged with to increase power delivery efficiency and reduces the overall length of transmission compared to synchronizer or friction clutch. However, it is not limited thereto, and a tooth-engaged with clutch or synchronizer that can minimize friction drag loss may be applied.

In addition, the first, second, third, fourth, fifth dog clutches DC1, DC2, DC3, DC4, and DC5 are known configurations, so detailed descriptions are omitted. As Generally, a separate actuator is provided, and the actuator is controlled by the transmission control unit while shifting.

As described above, the various exemplary embodiments of the present invention has a difference in the number of external gear sets applied to the fixed shifting section FT compared to the various exemplary embodiments of the present invention, and the connection relationship of other constituent elements is the same as that of the various exemplary embodiments and thus description of repeated configurations will be omitted.

In addition, the shifting device of the hybrid vehicle according to the various exemplary embodiments of the present invention is the same as the various exemplary embodiments in the shifting mode including the eCVT mode, the EV mode, and the charging mode in addition to the engine mode and the parallel mode having five fixed shifting stages. Since it is implemented in the same manner as the various exemplary embodiments of the present invention, repeated operation descriptions are omitted.

Figure 11:
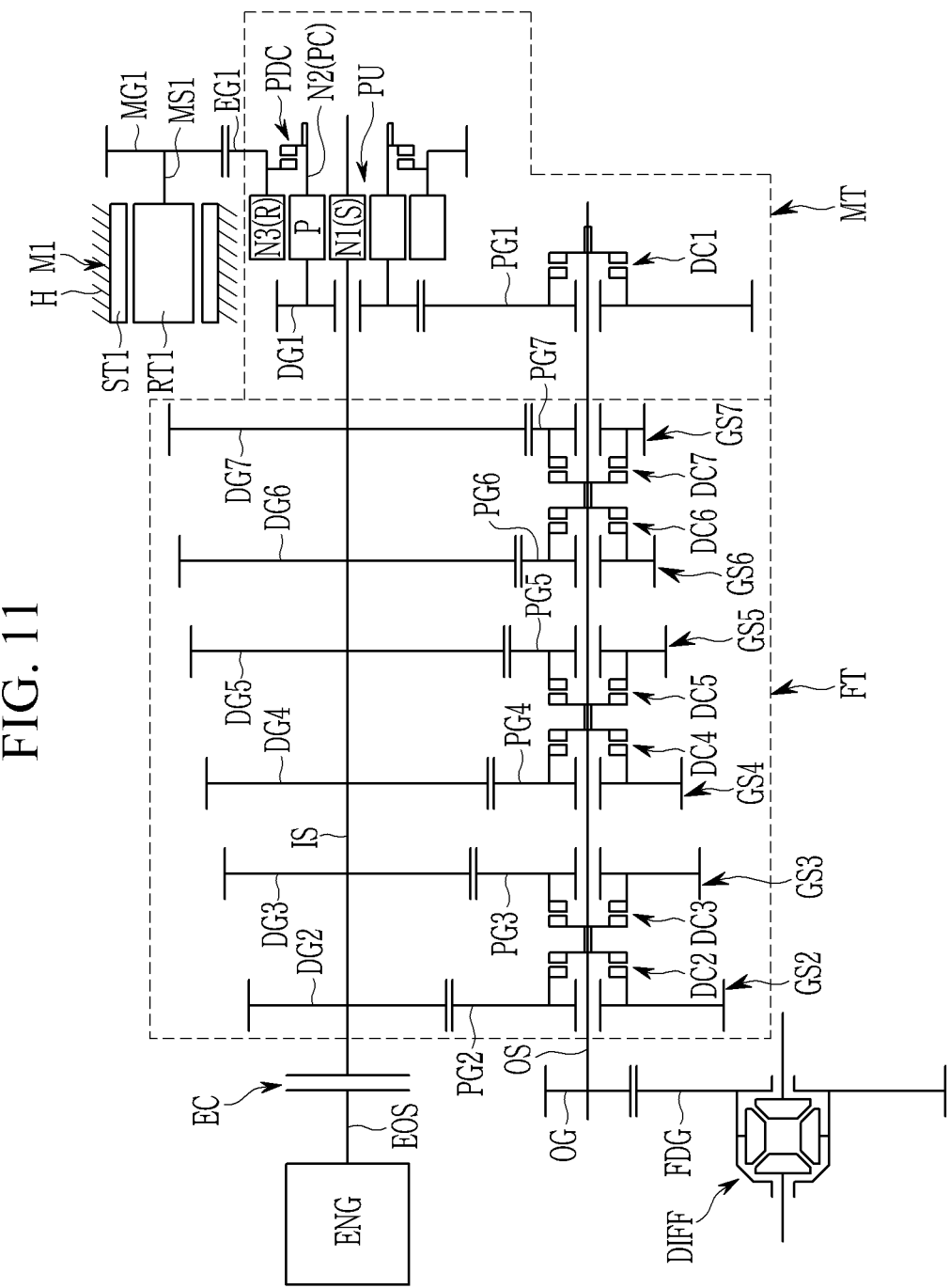
FIG. 11 is a schematic view of a hybrid power transmission apparatus for a vehicle according to various exemplary embodiments of the present invention.

FIG. 11 is a schematic view of a hybrid power transmission apparatus for a vehicle according to various exemplary embodiments of the present invention.

Referring to FIG. 11 the hybrid power transmission apparatus for a vehicle according to the various exemplary embodiments of the present invention has a difference in the number of external gear sets applied to the fixed shifting section FT compared to the configuration of the various exemplary embodiments in FIG. 10.

That is, the fixed shifting section FT according to the various exemplary embodiments in FIG. 11 further include sixth and seventh external gear sets GS6 and GS7 implementing a fixed shifting-stage of the sixth forward speed and the seventh forward speed configured between the input shaft IS and the output shaft OS compared to the various exemplary embodiments in FIG. 10.

The sixth external gear set GS6 includes a sixth drive gear DG6 fixedly mounted on the input shaft IS and a sixth driven gear PG6 externally gear-engaged with the sixth drive gear DG6 disposed on the output shaft OS without rotational interference, and implements the sixth forward speed gear ratio.

Here, the sixth driven gear PG6 is selectively connectable to the output shaft OS through the sixth engagement element clutch DC6, the sixth dog The seventh external gear set GS7 includes a seventh drive gear DG7 fixedly mounted on the input shaft IS and a seventh driven gear PG7 which is disposed on the output shaft OS without rotational interference and is externally gear-engaged with the seventh drive gear DG7, and implements the seventh forward speed gear ratio.

Here, the seventh driven gear PG7 is selectively connectable to the output shaft OS through the seventh engagement element, the seventh dog clutch DC7.

In the various exemplary embodiments of the present invention, each drive gear and driven gear forming the first, second, third, fourth, fifth, sixth and seventh external gear set GS1, GS2, GS3, GS4, GS5, GS6 and GS7. The gear ratio may be set according to the design condition of the transmission required.

In addition, in the various exemplary embodiments of the present invention, a dog clutch that powers connects all engagement elements except the engine clutch EC by teeth-engaged with to increase power delivery efficiency and reduces the overall length of transmission compared to synchronizer or friction clutch. However, it is not limited thereto, and a tooth-engaged with clutch or synchronizer that can minimize friction drag loss may be applied.

In addition, the first, second, third, fourth, fifth, sixth and seventh dog clutches DC1, DC2, DC3, DC4, DC5, DC6 and DC7 are known configurations, so detailed descriptions are omitted. As generally, a separate actuator is provided, and the actuator is controlled by the transmission control unit while shifting.

As described above, the various exemplary embodiments of the present invention in FIG. 11 has a difference in the number of external gear sets applied to the fixed shifting section FT compared to the various exemplary embodiments of the present invention in FIG. 10, and the connection relationship of other constituent elements is the same as that of the various exemplary embodiments and thus description of repeated configurations will be omitted.

In addition, the shifting device of the hybrid vehicle according to the various exemplary embodiments of the present invention in FIG. 11 is the same as the various exemplary embodiments in FIG. 1 in the shifting mode including the eCVT mode, the EV mode, and the charging mode in addition to the engine mode and the parallel mode having seven fixed shifting stages. Since it is implemented in the same manner as the various exemplary embodiments of the present invention in FIG. 1, repeated operation descriptions are omitted.

As described above, the hybrid power transmission apparatus configured for a vehicle according to the exemplary embodiments of the present invention further includes a planetary gear set PU that transmits the torque of the first motor M1 to the output shaft OS on the input shaft IS, so that when changing engine ENG mode, the torque of the first motor M1 is used to perform RPM synchronization through eCVT mode. Thus, it is possible to change the speed without the power of the engine ENG remaining, and thus, particularly in the engine mode shifting, a sense of torque disconnection can be minimized.

In addition, a fixed shifting section FT is disposed between the input shaft IS and the output shaft OS to implement a multi-stage fixed shifting-stage with a plurality of external gear sets, and the fixed shifting-stage may be extended by adding an external gear set.

In addition, the mode shifting section MT includes a planetary gear set PU and a first external gear set GS1 provided between the input shaft IS and the output shaft OS, and various shifting modes including the engine mode, the parallel mode, the eCVT mode, and the EV may be implemented together with fixed shifting section FT.

In addition, the dog clutch is applied as an engagement element that selectively connects the output shaft OS and the driven gears of all external gear sets, reducing the drag loss, which is the drawback of the existing friction clutch, improving power delivery efficiency, reducing the overall length and reducing weight and material.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

In addition, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A hybrid power transmission apparatus which changes and outputs torque of an engine and a first motor, the hybrid power transmission apparatus comprising:
   an input shaft disposed on a same axis as an engine output shaft to selectively receive torque of the engine from the engine output shaft through an engine clutch mounted between the input shaft and the engine output shaft;
   an output shaft that is disposed in parallel with the input shaft spaced from the output shaft, and is engaged with a differential final reduction gear through an output gear to output shifted torque;
   a fixed shifting section including a plurality of external gear sets for power connection between the input shaft and the output shaft at different gear ratios, and implementing an engine mode having a plurality of fixed shifting stages; and a mode shifting section including a planetary gear set having a first rotation element fixedly connected to the input shaft and a third rotation element that is gear-engaged with a first motor gear of the first motor via a first gear, and one external gear set configured for power connection between a second rotation element of the planetary gear set and the output shaft, wherein the mode shifting section implements parallel mode with the fixed shifting section, and independently implements electro continuously variable transmission (eCVT) mode, electric vehicle (EV) mode, or charging mode.

2. The hybrid power transmission apparatus of claim 1, wherein the planetary gear set further includes:

a planetary gear engagement element that is provided between the second rotation element and the third rotation element to selectively engage the second rotation element to the third rotation element.

3. The hybrid power transmission apparatus of claim 2, wherein when the planetary gear engagement element engages the second rotation element to the third rotation element, the entire planetary gear set rotates as one.

4. The hybrid power transmission apparatus of claim 2, wherein the planetary gear engagement element includes a tooth engagement type clutch or a synchronizer.

5. The hybrid power transmission apparatus of claim 2, wherein the planetary gear set is a single pinion planetary gear set in which the first rotation element is a sun gear, the second rotation element is a planet carrier, and the third rotation element is a ring gear.

6. The hybrid power transmission apparatus of claim 2, wherein the planetary gear set is a single pinion planetary gear set in which the first rotation element is a ring gear, the second rotation element is a planet carrier, and the third rotation element is a sun gear.

7. The hybrid power transmission apparatus of claim 1, wherein the one external gear set of the mode shifting section includes:

a first drive gear fixedly connected to the second rotation element; and a first driven gear rotatably mounted on the output shaft without rotational interference with the output shaft, gear-engaged to the first drive gear, and selectively connectable to the output shaft through a first engagement element;

wherein the one external gear set implements a first forward speed gear ratio.

8. The hybrid power transmission apparatus of claim 7, wherein the first drive gear is rotatably mounted on the input shaft without rotational interference with the input shaft.

9. The hybrid power transmission apparatus of claim 7, wherein the first engagement element includes a tooth engagement type clutch or a synchronizer.

10. The hybrid power transmission apparatus of claim 1, further including:

a second motor gear-engaged with a second gear fixedly mounted on the engine output shaft through a second motor gear fixedly connected to a rotor of the second motor.

11. The hybrid power transmission apparatus of claim 10, wherein the engine clutch includes a tooth engagement type clutch or a synchronizer.

12. The hybrid power transmission apparatus of claim 1, wherein the fixed shifting section includes:

a drive gear fixedly mounted on the input shaft; and a driven gear rotatably mounted on the output shaft without rotational interference with the output shaft, gear-engaged with the drive gear, and selectively connectable to the output shaft through an engagement element.

13. The hybrid power transmission apparatus of claim 12, wherein the engagement element includes a tooth engagement type clutch or a synchronizer.

14. The hybrid power transmission apparatus of claim 1, wherein the plurality of external gear sets includes:

a second external gear set including a second drive gear, which is fixedly mounted on the input shaft, and a second driven gear gear-engaged with the second drive gear rotatably mounted on the output shaft without rotational interference with the output shaft and selectively connectable to the output shaft through a second engagement element, wherein the second external gear set implements a second forward speed gear ratio of the different gear ratios; and a third external gear set including a third drive gear fixedly mounted on the input shaft, and a third driven gear gear-engaged with the third drive gear, rotatably mounted on the output shaft without rotational interference with the output shaft and selectively connectable to the output shaft through a third engagement element, wherein the third external gear set implements a third forward speed gear ratio of the different gear ratios.

15. The hybrid power transmission apparatus of claim 14, wherein the plurality of external gear sets further includes:

a fourth external gear set including a fourth drive gear fixedly mounted on the input shaft, and a fourth driven gear gear-engaged with the fourth drive gear, rotatably mounted on the output shaft without rotational interference with the output shaft, and selectively connectable to the output shaft through a fourth engagement element, wherein the fourth driven gear implements a fourth forward speed gear ratio of the different gear ratios; and a fifth external gear set GS5 including a fifth drive gear fixedly mounted on the input shaft, and a fifth driven gear rotatably mounted on the output shaft without rotational interference with the output shaft and gear-engaged with the fifth drive gear, and selectively connectable to the output shaft through a fifth engagement element, wherein the fifth driven gear implements a fifth forward speed gear ratio of the different gear ratios.

16. The hybrid power transmission apparatus of claim 15, wherein the plurality of external gear sets further includes:

a sixth external gear set including a sixth drive gear fixedly mounted on the input shaft and a sixth driven gear rotatably mounted on the output shaft without rotational interference with the output shaft, gear-engaged with the sixth drive gear and selectively connectable to the output shaft through a sixth engagement element, wherein the sixth external gear set implements a sixth forward speed gear ratio of the different gear ratios; and a seventh external gear set including a seventh drive gear fixedly mounted on the input shaft and a seventh driven gear rotatably mounted on the output shaft without rotational interference with the output shaft, gear-engaged with the seventh drive gear, and selectively connectable to the output shaft through a seventh engagement element, wherein the seventh driven gear implements a seventh forward speed gear ratio of the different gear ratios.

17. The hybrid power transmission apparatus of claim 16, wherein the second, third, fourth, fifth, sixth and seventh engagement elements are second, third, fourth, fifth, sixth and seventh dog clutches, respectively.

* * * * *